United States Patent [19]

Meeks, Jr.

[11] 4,065,966
[45] Jan. 3, 1978

[54] COMPRESSIBLE FLUID VELOCITY MEASURING INSTRUMENT

[76] Inventor: Crawford R. Meeks, Jr., 7883 Flight Place, Westchester, Calif. 90045

[21] Appl. No.: 664,276

[22] Filed: Mar. 5, 1976

Related U.S. Application Data

[63] Continuation-in-part of Ser. No. 577,235, May 13, 1975, abandoned.

[51] Int. Cl.² ............................................. G01F 1/28
[52] U.S. Cl. .................................................... 73/228
[58] Field of Search ................. 73/228, 430, 1 R, 1 B, 73/362.1, 362.4, 432 A; 177/216, 224

[56] References Cited

U.S. PATENT DOCUMENTS

| 1,712,760 | 5/1929 | Furnivall et al. | 73/228 |
| 2,939,319 | 6/1960 | Machlanski | 73/228 |
| 3,460,387 | 8/1969 | Brown | 73/228 X |
| 3,796,097 | 3/1974 | Ruskin | 73/228 |
| 3,815,413 | 6/1974 | Marshal | 73/430 X |

FOREIGN PATENT DOCUMENTS

| 165,194 | 6/1921 | United Kingdom | 73/228 |

Primary Examiner—Richard C. Queisser
Assistant Examiner—John P. Beauchamp
Attorney, Agent, or Firm—Noel B. Hammond

[57] ABSTRACT

A velocity measuring instrument of the type having a rotatable, counterweighted, spring-controlled vane and pointer assembly in which the outlet aperture for the fluid is contoured exponentially or logarithmically to present an exit flow area that varies as a function of vane position for linearizing the movement of the vane and pointer assembly in response to the pressure of the fluid on the vane. In one embodiment a true logarithmically varying area port is provided. In other embodiments, two or more openings of varying area or geometry are configured to approximate a logarithmic outlet aperture. A baffle may be provided on the exterior of the case to prevent fluid from entering the outlet aperture, and the interior of the case may be contoured adjacent to the outlet aperture and along the path of the vane to provide a variable leakage path clearance between the vane and the case. A grease-coated surface that contacts the vane and pointer assembly provides viscous damping to prevent pointer oscillation.

4 Claims, 13 Drawing Figures

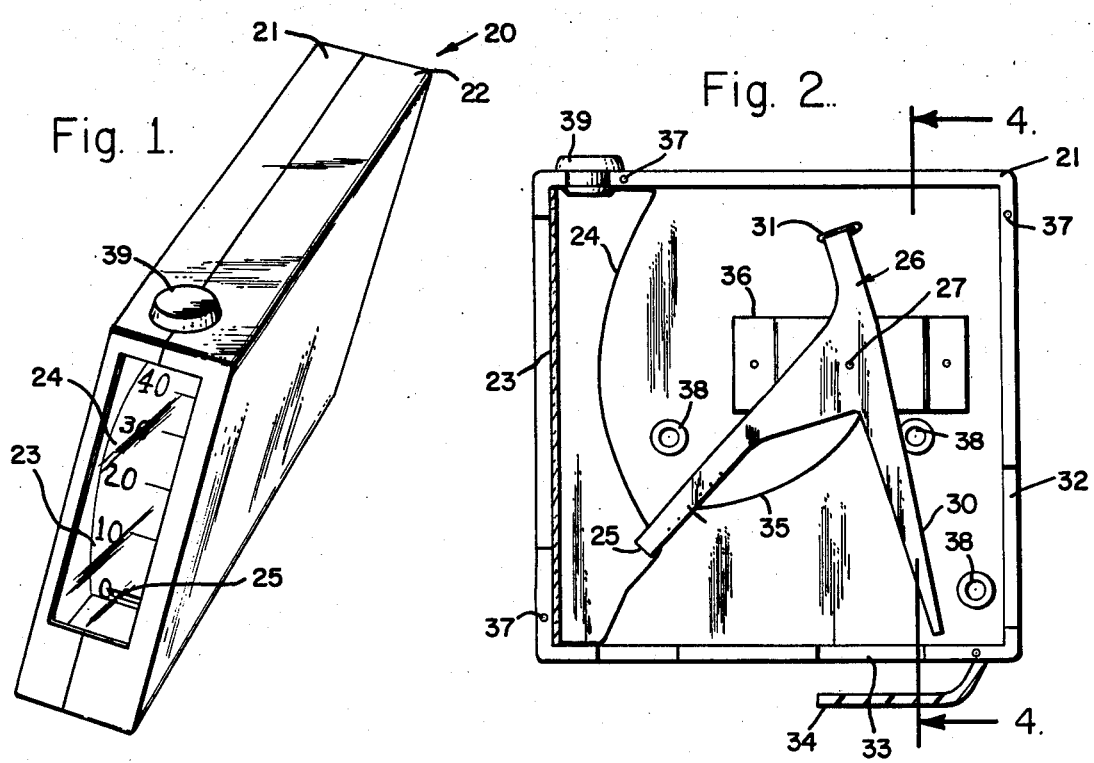
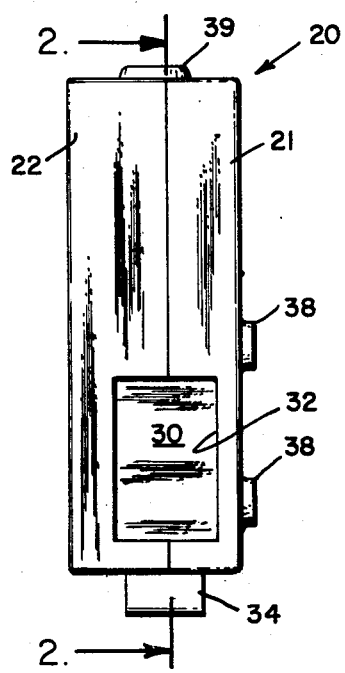
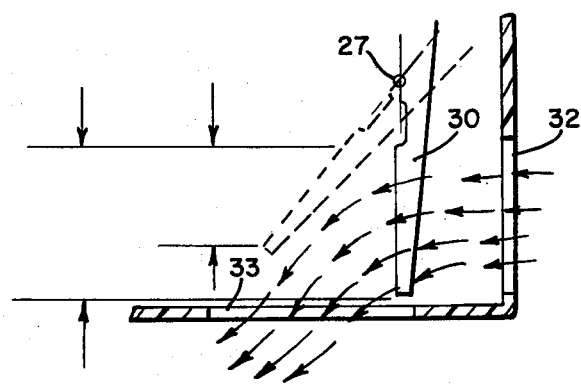

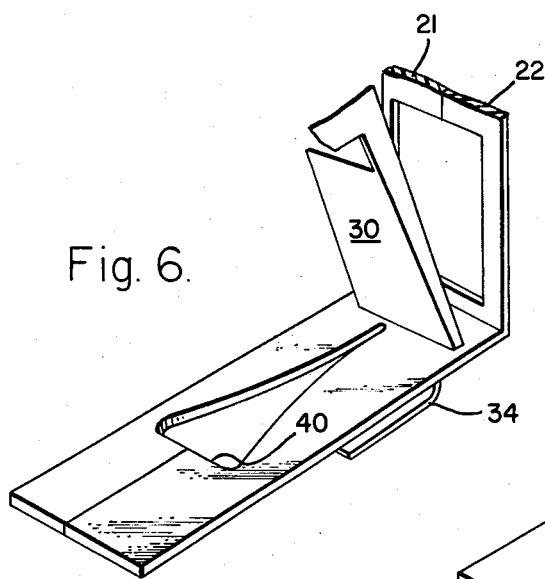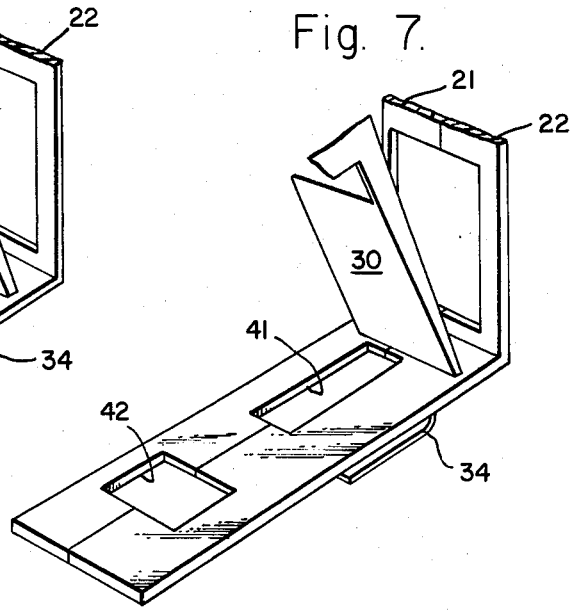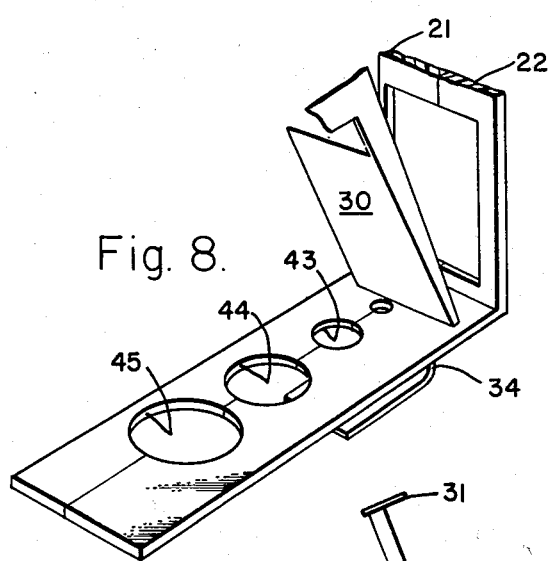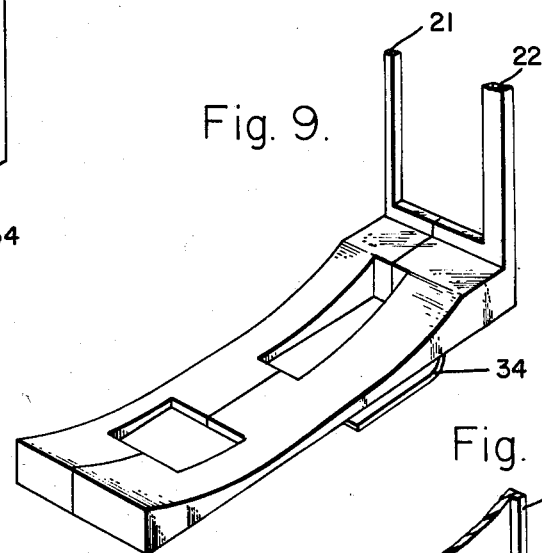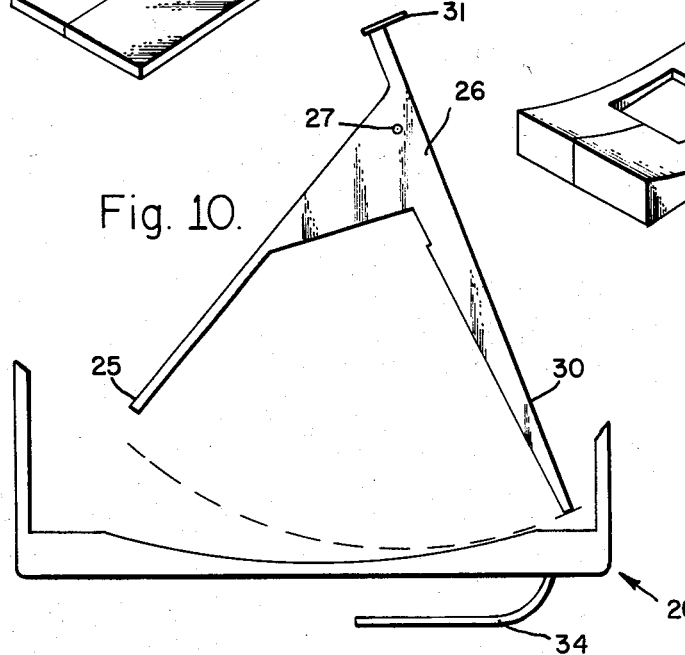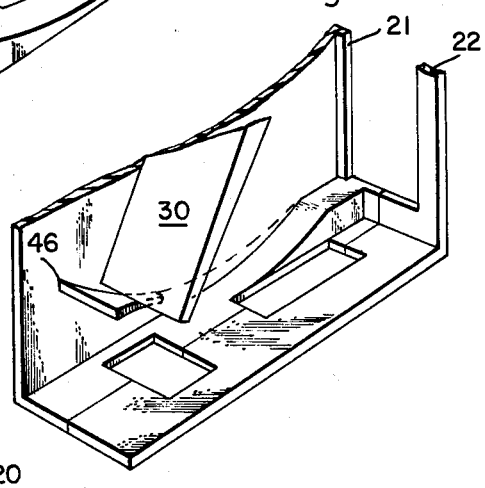

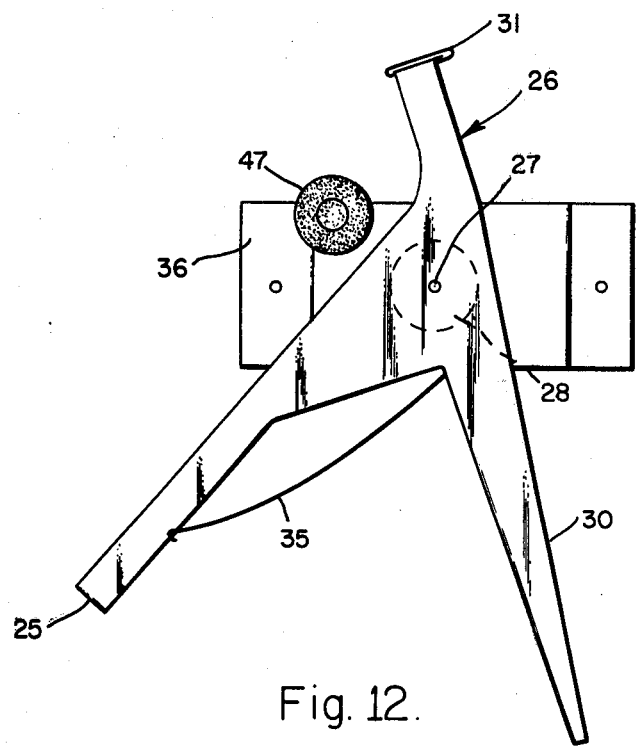
Fig. 12.
Fig. 13.
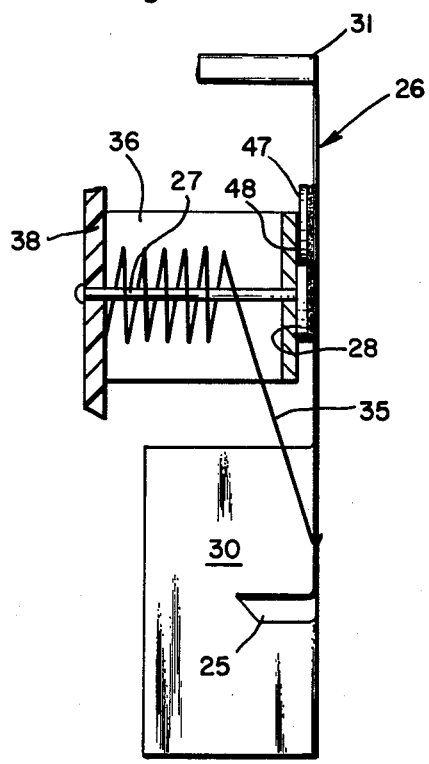

COMPRESSIBLE FLUID VELOCITY MEASURING INSTRUMENT

BACKGROUND OF THE INVENTION

This is a continuation-in-part of my prior copending application Ser. No. 577,235, filed May 13, 1975, abandoned, entitled Compressible Fluid Velocity Measuring Instrument.

Prior art velocity measuring instruments or air speed indicators generally do not have a linear scale readout. These prior art instruments usually have very fine graduations at one end of the range and widely spaced graduations at the other end. This skewed scale is due to the fact that dynamic pressure of force of the air on a vane varies as the square of velocity, and when resisted by a linear rate spring results in pointer deflection proportional to the square of velocity.

Furthermore, these prior art instruments frequently are sensitive to attitude and to the gravity acting on the instrument and accordingly there is an inaccuracy in the scale reading. Certain prior art instruments have had various intricate mechanisms for calibration that are complex and costly to manufacture.

Certain prior art instruments are sensitive to airborne dust and dirt due to close fitting moving parts that depend on precise control of leakage path fits for accuracy. Other prior art instruments that use pith balls with a close fit in a glass wall tube are sensitive to humidity variations which cause swelling or expansion of the ball thus changing the leak path clearances and introducing inaccuracies.

U.S. Pat. No. 1,712,760 to Furnivall et al. for a Fluid Meter discloses an instrument having a heavy gate pivoted to hang by the force of gravity at no flow against the entrance aperture, and to swing up when fluid enters the instrument, the gate resisting the flow of fluid solely by its weight. The gate is closely fitted to the housing, and a curved shield extends over the entire passage on the outflow side of the gate. The shield conforms closely to the path of the lower edge of the gate so that leakage between the lower edge and the shield is prevented, and the lower edge of the gate is provided with a machined strip. The flow takes place through a slot in the shield which is progressively uncovered as the gate swings up, thus providing a variable exit orifice. The slot is designed to make the angular movement of the gate directly proportional to the flow, and is of roughly inverted T shape with the head curving into the stem, and the stem tapered from the head. In another embodiment, the shield is not slotted, but curves away from the path of the edge of the gate, the variable exit orifice being the variable leakage path clearance between the bottom edge of the gate and the shield. However, the shield is curved such that the exit orifice is equal at all points to that provided by the slotted shield.

This prior art instrument has several disadvantages. It is sensitive to attitude and to the gravity acting on it. It requires expensive manufacture because of the precision required in the fit of the gate in the housing, even including a machined strip and a precisely contoured slot or shield. Because of the precision fit, it is sensitive to dirt and contamination. Also, it does not appear to be usable at low velocity flow rates (below possibly approximately 10 to 15 miles per hour).

It is, therefore, an object of the present invention to provide a simple compressible fluid velocity measuring instrument which provides a linearized pointer travel over the graduated scale instead of producing a non-linear travel that would require a skewed scale proportional to the square of velocity.

Another object of the invention is the provision of a compressible fluid velocity measuring instrument which is insensitive to attitude. It is a further object of the invention to provide a very simple calibration adjustment feature.

A further object of the present invention is to provide a compressible fluid velocity measuring instrument which is insensitive to the force of gravity.

A further object of the present invention is to provide a compressible fluid velocity measuring instrument which uses non-precision fitted parts and which is insensitive to dust, dirt and changes in humidity.

SUMMARY OF THE INVENTION

In accordance with these and other objects of the invention, there is provided a simple mechanism for measuring the velocity of a flowing fluid which enters an aperture port and impinges on a flat vane with an integral pointer that is pivoted to move away from the incoming flow. A spring is used to control the vane-pointer rotation in proportion to the fluid force. Rotation of the vane reduces the frontal area in proportion to the angle of rotation which approximately linearizes the pointer travel over the graduated scale. The outlet port area is also contoured to further approach true linear proportionality between fluid velocity and pointer deflection. The outlet port is contoured to expose a port whose out-flow area varies logarithmically as a function of vane position.

In one embodiment the outlet port is a true logarithmically varying port. In a second embodiment two rectangular apertures are provided of different sizes which in combination with a variable area leakage path between the vane and the inside bottom surface of the case approximate a logarithmic port for low cost manufacture. In a third embodiment a series of holes of different diameters are used to approximate the logarmically varying port.

To further linearize the instrument a variable area leakage clearance is provided between the blade edge and the bottom of the case which provides a contoured variable clearance for the vane. Inasmuch as the case is completely enclosed the air that enters the entrance aperture can only exit by means of this variable area leakage clearance and through the logarithmic area port. This produces a readout of better resolution accuracy of the entire range of measurement which would not be true of a non-linear scale readout which would have very fine graduations at one end of the range and widely spaced graduations at the other end.

A counterweight is used to balance the vane-pointer to make the instrument insensitive to attitude due to gravity acting on the vane. A viscous fluid (grease) is used on the pointer shaft thrust bearing to damp oscillations of the pointer to give a steady reading.

In another embodiment of the invention, a grease-coated flat surface is provided which fits in close proximity to the moveable vane-pointer and presents an increasing sheer surface area as the vane-pointer is deflected by higher valocity fluid flow. This non-linear viscous damper prevents pointer oscillation at high velocity flows where greater damping is needed, but does not produce errors at low velocity flows where the fluid forces and restraining spring forces are very low.

BRIEF DESCRIPTION OF THE DRAWINGS

The foregoing and other objects and features of the present invention can be more readily understood with reference to the following detailed description, taken in conjunction with the accompanying drawings, wherein like reference numerals designate like structural elements, and in which FIG. 1 is a perspective view of one embodiment of a compressible fluid velocity measuring instrument showing the readout scale and pointer;

FIG. 2 shows the interior of the velocity measuring instrument of FIG. 1 with half of the case removed along the lines 2—2 to expose the mechanism thereof;

FIG. 3 is a view of the rear of the instrument of FIGS. 1 and 2 showing the entrance aperture and bosses for the mounting screws;

FIG. 4 is a view in cross section of the instrument shown in FIG. 2 taken along the lines 4—4;

FIG. 5 is a diagram showing the air flow through the instrument of the present invention and indicating the change in vane frontal area due to pivoting of the rotating vane;

FIG. 6 is a view of the interior of the bottom of the case of the instrument of FIGS. 1 through 5 showing the variable area exit port made in a truly logarithmic fashion and showing the baffle mounted on the bottom exterior surface to prevent fluid from entering the exit port when the instrument is tilted with respect to the direction of fluid flow;

FIG. 7 is a view of the bottom interior of the case having rectangular exit ports to approximate a logarithmic port;

FIG. 8 is a view of the interior bottom of the case showing the use of round holes of varying area to approximate a logarithmic exit port;

FIG. 9 is a view of the bottom interior of the case showing a contoured variable clearance at the bottom of the case between the vane edge and the bottom of the case to provide control of fluid leakage;

FIG. 10 is a side view of the bottom of the case showing the variable area leakage clearance between the vane edge and the bottom of the case shown in FIG. 9;

FIG. 11 is a view of the bottom and inside of the case of another embodiment of the invention showing a flow deflector which creates a variable leakage and variable area flow path both of which vary with the position of the vane;

FIG. 12 is an illustration of another embodiment of the invention incorporating a non-linear viscous damper; and FIG. 13 is another view of the embodiment of the invention of FIG. 12 showing details of the non-linear viscous damper.

DETAILED DESCRIPTION OF THE INVENTION

The compressible fluid velocity measuring instrument of the present invention is a simple mechanism for measuring the velocity of a flowing fluid. Specifically it may be used to measure the air speed of aircraft, gliders, kites, sail boats or the like. It may also be used to measure the speed of atmospheric wind.

Referring now to FIG. 1 of the drawings there is shown a case 20 which may be assembled of two sections 21, 22 each made of molded plastic or other like material. In the front of the case 20 there is a transparent plastic window 23 through which may be seen a graduated scale 24 made of aluminum or other like material and attached to the case 20 by epoxy or the like and the pointer 25 made of stamped metal or the like which indicates the fluid velocity.

Referring now to FIG. 2 the graduated scale 24 extends arcuately from the top of the case to the bottom of the case and the pointer 25 is an arm on a rotatable vane assembly which is rotatably mounted on a pivot pin 27. The vane assembly 26 has a vane 30 disposed near the bottom of the case 20 and a counterweight 31 of dense material such as copper or lead disposed near the top of the case 20. The counterweight 31 is attached to the vane assembly 26 by staking or other suitable means. The counterweight 31 is of such mass as to exactly balance the rotatable vane assembly 26 about the centerline of the pivot pin 27. The vane 30 is located adjacent to an entrance aperture 32 through which the fluid whose velocity is to be measured enters the case 20. A removable rubber plug 39 is provided in the top of the case 20 for access to clean dust from the back side of the window 23.

The fluid after entering the case 20 and displacing the vane 30 exits through the exit aperture 33 in the bottom of the case 20 passing through the baffle 34. A spring 35 is disposed around the pivot pin 27 and below a rectangular bracket 36 of metal or other like material which is attached to one section 21 of the case 20 by epoxy or glue. The spring 35 is secured to the case 20 and the graduated scale 24 by guide holes and epoxy. The movable end of the spring 35 is attached to the pointer 25 by inserting it into one of a multiplicity of holes in the pointer 25. Selection of different holes gives a means of calibrating the instrument. The other section 22 of the case 20 is fastened to the first section 21 of the case 20 by means of alignment pins 37 and cement. The case 20 may be mounted to a vehicle by means of screws which engage threaded bosses 38 with metal threaded inserts heat-set into the case 20.

Referring now to FIG. 3, the back of the case 20 may be seen showing how the vane 30 faces the entrance aperture 32. Also the mounting bosses 38 may be easily seen as well as the baffle 34 which prevents incoming air from entering the exit aperture 33.

FIG. 4 is a view of the back of the case 20 from the same angle as in FIG. 3 but cut in section along the lines 4—4 of FIG. 2. In FIG. 4 the spring 35 may be seen mounted with the rectangular bracket 36 and around the pivot pin 27. Also the relationship of the various parts of the vane assembly 26 may be seen, such as the counterweight 31 and the vane 30. A thrust washer 28 between the rotatable vane assembly 26 and the rectangular bracket 36 serves to space the rotatable vane assembly 26 within the case 20, and when coated with a viscous fluid such as grease, provides damping to prevent pointer oscillation. The diameter of the washer 28 can be selected to provide the proper amount of damping at the low flow rate velocity range of the instrument.

Referring now to FIG. 5, the arrows indicate the air flow through the entrance aperture 32 past the vane 30 and through the exit aperture 33, indicating how, as the vane 30 is moved by the air flow, the frontal area it presents to the entrance aperture 32 is reduced.

FIG. 6 shows a true logarithmic outlet port 40 whose area varies logarithmically from one end to the other as a function of vane position so as to produce a further compensation for linear travel in addition to the change in the reduced frontal area presented by the vane 30.

This instrument provides a small area outlet port 40 at the beginning of the stroke of the vane 30, with an increasing area outlet port 40 as the vane 30 deflects at higher flow rates. Rather than choking the flow in the case 20 to reduce the deflection of the pointer 25 at higher flow rates and using the changing gravity restoring force due to gate rotation, the present invention employs the principle of an increasing area outlet port 40 allowing more of the flow to exit the case 20 instead of creating forces on the vane 30, and therefore preventing non-linear deflection of the vane 30 at higher flow rates.

In the present invention, because the vane 30 is not precision-fitted to the case 20, the fluid flow patterns are a combination of separation and impulse forces. Part of the energy of the incoming flow impacts on the vane 30 and produces a deflection force, but there is separation of the flow around the sides of the vane 30, and below and above the vane 30. The actual performance and behavior of an instrument like the present device is almost always determined by semi-empirical methods because of the complex flow patterns due to the combination of flow separation and momentum exchange that occurs between the incoming fluid and the vane 30.

FIG. 7 is a view similar to FIG. 6 showing a different exit aperture 33 in which the logarithmic characteristics are approximated by two rectangular openings 41 and 42 of different sizes and shapes.

FIG. 8 shows a different embodiment in which the logarithmic characteristics are approximated by three round holes 43, 44 and 45 of different diameters. FIGS. 9 and 10 show an embodiment in which the clearance between the edge of the vane 30 and the bottom of the case 20 is varied to provide a variable area leakage. In FIG. 10 the path of the arc of the vane 30 is indicated by the dashed line, whereas the contour of the bottom is indicated by the solid line and, as can be clearly seen, the clearance at the bottom of the case 20 is contoured to present a variable area leakage path as the vane 30 traverses its path. FIG. 11 shows a more producible embodiment of the invention using the same principles as FIG. 9 but avoiding a bulky section of plastic that is difficult to mold by injection molding methods. A flow deflector 46 which is an integral part of the case section 21 serves as a leak path and out-flow aperture that varies as a function of vane position.

The reason why both the variable area exit aperture 33 and the variable clearance between the edge of the vane 30 and bottom of the case 20 are employed is that attempts to compensate for non-linear deflection solely through the use of the variable area exit aperture 33 result in the exit aperture 33 becoming unreasonably large at high flow rates. By using both the increasing leakage path and the increasing area exit aperture 33, a more practical design and a more reasonable package size can be achieved.

In operation the fluid flows into the entrance aperture 32 and impinges on the flat vane 30 which is pivoted to move away from the incoming flow. The spring 35 controls the vane-pointer rotation in proportion to the fluid force. The force on the vane 30 is proportional to the frontal area of the vane 30 and proportional to the square of the velocity of the incoming fluid. Rotation of the vane 30 reduces the frontal area in proportion to the angle of rotation which is a cosine-squared function. The reduction of vane frontal area with rotation will approximately linearize the pointer travel over the graduated scale 24 instead of producing a non-linear travel that would require a skewed scale proportional to the square of velocity. The logarithmically contoured exit aperture 32 also contributes to an approach to true linear proportionality between fluid velocity pointer deflection. The counterweight 31 balances the vane assembly 26 to make the instrument insensitive to attitude due to gravity acting on the vane 30. The baffle 34 prevents fluid from entering the exit aperture 33.

Referring now to FIGS. 12 and 13, there is shown an embodiment of the invention in which a grease-coated flat surface is provided which fits in close proximity to the moveable vane assembly 26 and presents an increasing shear surface area as the vane assembly 26 is deflected by higher velocity fluid flow. This non-linear viscous damper prevents pointer oscillation at high flow rates where greater damping is needed, but does not produce errors at low flow rates where the fluid forces and restraining spring forces are very low.

A damping plate 47, which may be a flat metal washer or the like, is attached to the rectangular bracket 36 by spotwelding 48, epoxy cement, or other suitable means, and is so disposed as to engage the surface of the rotatable vane assembly 26 with an area that increases with deflection of the vane assembly 26. The damping force produced increases with increasing area of engagement between the vane assembly 26 and the damping plate 47, thus producing high damping at high flow rates where oscillation tends to be more severe, but avoiding hysteresis errors at low flow rates where flow forces and spring return forces are very low. The size of the damping plate 47 is chosen to produce the required amount of viscous damping for the velocity range of the instrument and the oscillation forces involved. If a flat washer is employed as the damping plate 47, the central hole may be employed as a reservoir for the grease.

Thus there have been shown and described embodiments of a simple compressible fluid velocity measuring instrument which has a linear readout and which is insensitive to attitude and the effects of gravity, is insensitive to dust and dirt and insensitive to atmospheric humidity.

It is to be understood that the above described embodiments of the invention are merely illustrative of the many possible specific embodiments which represent applications of the principles of the present invention. Numerous and varied other arrangements can be readily devised in accordance with these principles by those skilled in the art without departing from the spirit and scope of the invention.

What is claimed is:

1. A velocity measuring instrument comprising:
   a case for immersion in a flowing fluid and having an entrance aperture for the entrance of said fluid, a variable flow area outlet aperture for the exit of said fluid, and a window;
   a lightweight, counterweighted vane assembly pivotally mounted for rotation within said case and having a vane disposed adjacent said entrance aperture and responsive to said fluid entering therethrough, and having a pointer adjacent said window; and
   a spring coupled to said vane assembly for controlling the movement thereof;
   said variable flow area outlet aperture being contoured to vary the flow area of said outlet aperture substantially exponentially as a function of the position of said vane assembly for linearizing the movement of said vane assembly in response to the pressure of said fluid on said vane;

the inside of said case being contoured on both sides of said outlet aperture along the arc described by said vane as said vane assembly rotates to provide a variable clearance between said vane and the inside of said case to permit a larger area aperture at the high flow rate end.

2. A velocity measuring instrument comprising:

a case for immersion in a flowing fluid and having an entrance aperture for the entrance of said fluid, a variable flow area outlet aperture for the exit of said fluid, and a window;

a lightweight, counterweighted vane assembly pivotally mounted for rotation within said case and having a vane disposed adjacent said entrance aperture and responsive to said fluid entering therethrough, and having a pointer adjacent said window; and a spring coupled to said vane assembly for controlling the movement thereof;

said variable flow area outlet aperture being contoured to vary the flow area of said outlet aperture substantially exponentially as a function of the position of said vane assembly for linearizing the movement of said vane assembly in response to the pressure of said fluid on said vane;

the inside of said case being contoured on one side of said variable flow area outlet aperture along the arc described by said vane as said vane assembly rotates to provide a variable flow area between said vane and the inside of said case that is a function of vane position to permit a larger area outlet aperture at the high flow rate end.

3. A velocity measuring instrument comprising: a case for immersion in a flowing fluid and having an entrance aperture for the entrance of said fluid, a variable flow area outlet aperture for the exit of said fluid, and a window;

a lightweight, counterweighted vane assembly pivotally mounted for rotation within said case and having a vane disposed adjacent said entrance aperture and responsive to said fluid entering therethrough, and having a pointer adjacent said window; and a spring coupled to said vane assembly for controlling the movement thereof;

said variable flow area outlet aperture being contoured to vary the flow area of said outlet aperture substantially exponentially as a function of the position of said vane assembly for linearizing the movement of said vane assembly in response to the pressure of said fluid on said vane;

said vane assembly being provided with a non-linear viscous damper which provides high damping at high flow rates, and low damping at low flow rates, said non-linear damper comprising a damping plate coated with grease and mounted in close proximity to said vane assembly and disposed so as to engage the surface of said vane assembly with an area that increases with increasing deflection of said vane assembly.

4. A velocity measuring instrument comprising:

a case for immersion in a flowing fluid and having an entrance aperture for the entrance of said fluid, a variable flow area outlet aperture for the exit of said fluid, and a window;

a lightweight, counterweighted vane assembly pivotally mounted for rotation within said case and having a vane disposed adjacent said entrance aperture and responsive to said fluid entering therethrough, and having a pointer adjacent said window; and a spring coupled to said vane assembly for controlling the movement thereof;

said variable flow area outlet aperture being contoured to vary the flow area of said outlet aperture substantially exponentially as a function of the position of said vane assembly for linearizing the movement of said vane assembly in response to the pressure of said fluid on said vane;

said entrance aperture being located to be upstream of said outlet aperture when said case is immersed in a flowing fluid;

a baffle being provided on the exterior of said case adjacent to and partially surrounding said outlet aperture, said baffle being closed toward the upstream side and toward the entrance aperture, and being open toward the downstream side, said baffle extending over said outlet aperture but spaced away therefrom to prevent the entry of fluid through said outlet aperture when said case is completely immersed in a flowing fluid with varying angles of attack to the entrance aperture.

* * * * *